Patented May 1, 1928.

1,668,275

UNITED STATES PATENT OFFICE.

WILHELM HESS, OF BERLIN, GERMANY.

TREATMENT OF HYDROCARBONS.

No Drawing. Application filed September 7, 1926, Serial No. 134,134, and in Germany September 25, 1925.

This invention relates to processes of treating hydrocarbons in which hydrocarbons are subjected to the action of a liquid sulphur dioxide and it comprises the process in which the hydrocarbons to be treated are first contacted with gaseous sulphur dioxide and thereafter treated with liquid sulphur dioxide.

My invention relates to an improvement of the Edeleanu process (see, for example, U. S. Patent 911,553). The Edeleanu process is concerned with the refining of mineral oil hydrocarbons with liquid sulphur dioxide. The process is carried out in such a manner that the mineral oil hydrocarbons are mixed with liquid sulphur dioxide, the aromatic and unsaturated hydrocarbons being dissolved in the liquid sulphur dioxide, whereas the aliphatic and saturated hydrocarbons remain undissolved in the sulphur dioxide. When carrying out this process, there are small losses of sulphur dioxide partly through incidental slight leakages in the closed apparatus and partly owing to the fact that the oils treated with the sulphur dioxide contain fractions of percentage of sulphur dioxide when leaving the apparatus.

In the process above referred to, which represents the present day practice, it is customary to make up the sulphur dioxide losses by the addition of small quantities of liquid sulphur dioxide. This constitutes an economic disadvantage by virtue of the fact that liquid sulphur dioxide is more expensive than gaseous sulphur dioxide and further constitutes a practical disadvantage by virtue of the fact that more sulphur dioxide must be liquefied than that actually put to use to purify the oil.

It is therefore an object of this invention to devise a process which overcomes the disadvantage of using liquid sulphur dioxide to make up the losses occurring as above set forth.

I have found that it is unnecessary to make up the losses of liquid sulphur dioxide providing I preliminarily treat the oil with gaseous sulphur dioxide until the oil has substantially absorbed about ½% or less based on the weight of oil. Thereafter, when subjecting the so treated oil to the action of liquid sulphur dioxide, virtually no losses of liquid sulphur dioxide are observed.

The oils, which are to be subjected to the treatment with sulphur dioxide are allowed to trickle over a tower filled with Raschig rings or with any other suitable filling and distributing material or provided with suitable insertions, at the lower end of which tower the combustion gases from a sulphur or iron pyrites kiln enter and flow in the opposite direction to the liquid. Kerosene, as well as gas oil and lubricating oil distillates readily absorb ½% and more sulphur dioxide from the combustion gases; the lower the temperature, the more of the sulphur dioxide gas will be absorbed. Since however the losses in sulphur dioxide, if the Edeleanu process is carefully carried out, scarcely amount to ½% but are in most cases very much less, there is no doubt that, even in cases where very high temperatures have to be contended with, that amount of sulphur dioxide will be absorbed which is afterwards lost again in the working up process.

According to the invention therefore, when a plant is set into operation, the quantity of liquid sulphur dioxide which is required for treating the oil need be but supplied once, while all working losses which occur are made good in the manner described above. The source from which to $SO_2$ gases are obtained, does not affect the invention and the manner in which it is carried out, the characteristic feature being the fact that the absorption capacity of the petroleum hydrocarbons with respect to $SO_2$ gases is made use of in order thereby to avoid the costs and losses, which necessarily occur with liquefaction. The purer are the gases, which are used for absorption the easier it is to carry out the new process, which culminates in the use of combustion gases of sulphur in oxygen.

Having now particularly described and ascertained the nature of my said invention and in what manner it is to be performed, I declare that

What I claim is:—

1. The process of treating hydrocarbons which comprises preliminarily treating the hydrocarbons with gaseous sulphur dioxide and thereafter subjecting the hydrocarbons to the action of liquid sulphur dioxide.

2. The process of treating hydrocarbons which comprises passing the hydrocarbons in counter-current relation to a stream of sulphur dioxide gas until the hydrocarbons have absorbed about ½% sulphur dioxide, and thereafter subjecting the so treated hydrocarbons to the action of liquid sulphur dioxide.

In testimony whereof I have signed my name to this specification.

WILHELM HESS.